A. EHEBALD.
PIPE CONNECTION FOR GAS METERS.
APPLICATION FILED MAY 4, 1908.
914,250.
Patented Mar. 2, 1909.
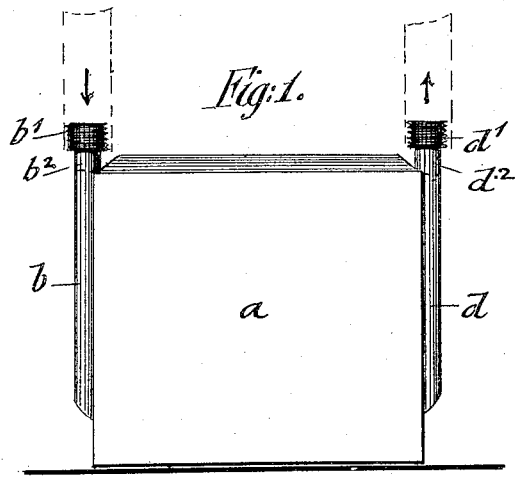
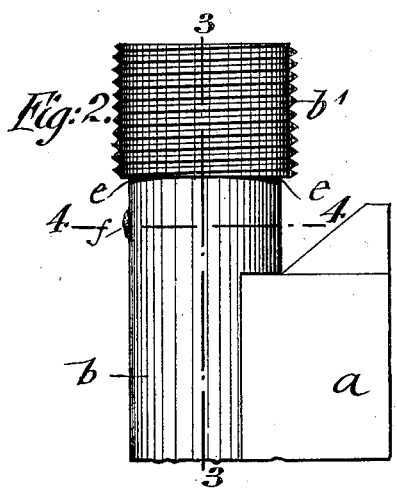
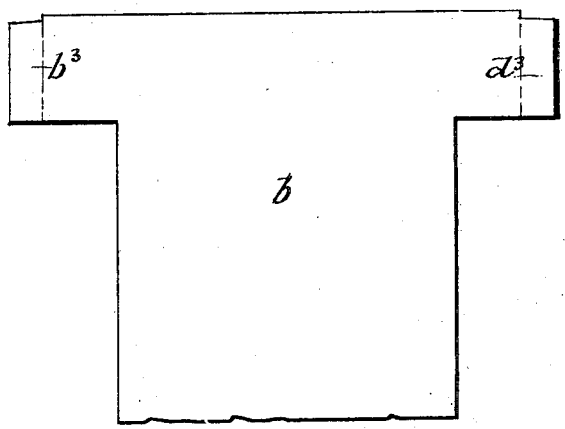
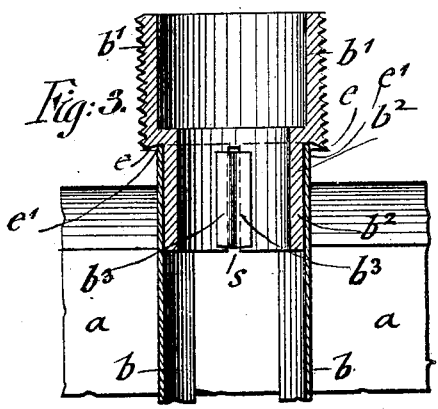
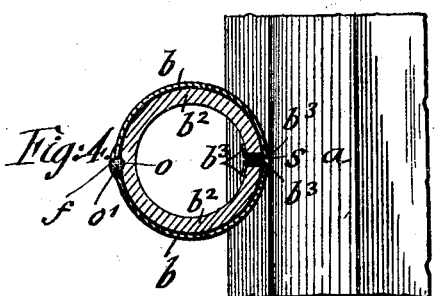
Witnesses:
Fannie Fisk
Henry J. Suhrbier
Inventor
Adam Ehebald
By his Attorneys
Goepel & Goepel
THE NORRIS PETERS CO., WASHINGTON, D. C.

UNITED STATES PATENT OFFICE.

ADAM EHEBALD, OF NEW YORK, N. Y.

PIPE CONNECTION FOR GAS-METERS.

No. 914,250.   Specification of Letters Patent.   Patented March 2, 1909.

Application filed May 4, 1908. Serial No. 430,672.

*To all whom it may concern:*

Be it known that I, ADAM EHEBALD, a citizen of the United States of America, residing at New York, in the borough of the Bronx, county and State of New York, have invented certain new and useful Improvements in Pipe Connections for Gas-Meters, of which the following is a specification.

This invention relates to an improved pipe-connection for gas-meters.

The gas-meters in general use are provided at one side with a gas-inlet pipe and at the opposite side with an outlet-pipe, to the upper ends of which a threaded union is applied by which the connection is made with the supply-pipe from the street-main and with the service-pipe for the building.

In making the connection of the main and service-pipes with the inlet and outlet pipes of the gas-meters, the unions at the upper ends of these pipes are frequently loosened and wrenched off so that the pipes leak at these points of connection and require frequent repairs, which not only involves considerable expense but also great annoyance to the gas companies.

The object of this invention is to furnish an improved pipe-connection for gas-meters by which leakage due to the loosening of the unions at the ends of the inlet and outlet pipe of the gas-meters is obviated and a reliable connection with the main and service pipes obtained, while in case of repairs, the unions can be easily detached and new unions or new outlet or inlet-pipes substituted, as required; and for this purpose the invention consists of a pipe-connection for gas-meters which comprises an inlet or outlet-pipe having a threaded union having a longitudinally-slitted nipple connected with the upper end of the inlet or outlet-pipe, the upper end of the inlet or outlet-pipe being wrapped around the nipple and provided with inwardly-bent lugs that are inserted through the slit of the nipple for locking the union firmly in the inlet or outlet-pipe.

The invention consists further in providing the union below its threaded portion with an undercut into which the upper edge of the outlet or inlet pipe is inserted and soldered so as to prevent leakage at that point.

The invention consists lastly of a soldered anchor between the nipple of the union and the inlet or outlet pipe, at a point opposite to the slit, said anchor forming an additional locking connection between the nipple of the union and the inlet or outlet-pipe, as will be fully described hereinafter and finally pointed out in the claims.

In the accompanying drawings, Figure 1 represents a side-elevation of a gas-meter of the ordinary construction with my improved pipe-connections, Fig. 2 is a side-elevation of one of the pipe-connections drawn on a larger scale, Fig. 3 is a vertical central section through the pipe-connection on line 3, 3, Fig. 2, Fig. 4 is a horizontal section on line 4, 4, Fig. 2, and Fig. 5 represents a blank for the inlet or outlet-pipe of the gas-meter.

Similar letters of reference indicate corresponding parts.

Referring to the drawings, $a$ represents a gas-meter of the ordinary well-known construction. The gas-meter is provided at one side with an inlet-pipe $b$ and at the opposite side with an outlet-pipe $d$. To the upper ends of the inlet and outlet-pipes are applied unions $b^1$ and $d^1$, which unions are respectively connected with the street main that supplies the gas from the street in the usual manner, and with the service-pipe for the building. The unions $b^1$, $d^1$ are each provided with a threaded upper portion and a smooth nipple $b^2$, $d^2$ below the same, the nipple being provided at one point of the circumference with a longitudinal slit $s$ into which are inserted inwardly-bent lugs $b^3$, $d^3$ formed at the upper ends of the inlet or outlet-pipes. The inlet and outlet-pipes are made of sheet metal, preferably tin, of the blank shown in Fig. 5, the upper ends being made wider in such a manner that they lap around the nipples of the unions $b^1$, $d^1$ while the lugs at their ends are inserted side by side into the slits $s$ of the same and bent in opposite directions. The upper ends of the inlet and outlet-pipes are then soldered to the nipples of the unions so that a firm locking connection is obtained. By the inwardly-bent lugs the union is prevented from getting loose and being turned in either direction when screwing the main and service-pipes on the threaded unions, so that in this way the resulting leakage at these points is prevented, and thereby the loss of gas and expense for repairs obviated.

To render the connection of the upper ends of the inlet and outlet-pipes with the unions still more intimate, the lower edge of the threaded unions $b^1$, $d^1$ is undercut at $e$, as shown in Fig. 3, so that the upper edge $e^1$ of the inlet or outlet-pipe projects into said undercut $e$. When the solder is placed in the undercut $e$ over the edge $e^1$, an absolutely tight connection between the unions and inlet and outlet-pipes is obtained. To still more increase the locking connection between the union and the inlet and outlet pipes, the nipple of each union is provided with a depression $o$ and the upper portion of the inlet or outlet-pipe with a hole $o^1$, through which solder is passed, so that a soldered anchor $f$ with a wiped head is formed, preferably at a point diametrically opposite the slit $s$ in the nipple at the outside of the upper end of the inlet or outlet-pipe, whereby an auxiliary means of resisting any turning strain on the union when applying or removing the main or service-pipe is obtained.

The improved construction of the pipe connection between the gas-meter and the main and service-pipes of the same obviates the objections to the ordinary connections heretofore in use, in which the unions became loose and produced thereby leaky joints and expensive and annoying repairs. These are entirely avoided by my improved pipe-connection. In this way not only labor, time and expense is saved, but the annoyance of such leaks and repairs to the gas users dispensed with.

Having thus described my invention, I claim as new and desire to secure by Letters Patent:

1. In a pipe-connection for gas-meters, the combination of a union having a slit, and a pipe having lugs entering said slit side by side and locked therein.

2. In a pipe-connection for gas-meters, the combination of a union having a longitudinal slit, and a pipe around the nipple having lugs entering said slit from the outside and bent in opposite directions.

3. A pipe-connection for gas-meters, comprising a pipe formed of a blank having lugs at the meeting edges, and a union having a nipple with a slit in which said lugs are locked.

4. In a pipe-connection for gas-meters, the combination of a union having a longitudinal slit, and a pipe formed of a blank having a widened end wrapped about the union and having terminal lugs inserted side by side through said slit and bent in opposite directions.

5. In a pipe-connection for gas-meters, the combination of a union provided with a threaded upper portion and a smooth nipple below the same, said nipple being provided with a longitudinal slit, and a pipe formed of a blank wrapped around the nipple and connected at the meeting edges by inwardly-bent lugs with the slitted portion of the nipple.

6. In a pipe-connection for gas-meters, the combination of an inlet or outlet-pipe, a union provided with a threaded upper portion, and undercut at its lower edge and a smooth nipple, the nipple being provided with a longitudinal slit at one point of its circumference, the upper edge of the inlet or outlet pipe being wrapped around the nipple and provided with lugs inserted into the slit of the same, while the upper edge of the nipple is inserted into and soldered in the undercut of the union.

7. A pipe-connection for gas-meters comprising an inlet or outlet pipe, a union having a smooth nipple, and a slit in said nipple, the upper end of the inlet or outlet-pipe being wrapped around the nipple and connected by inwardly-bent lugs with the slitted portion of the nipple, and a soldered anchor located at a point approximately opposite to the connection between the upper portion of the inlet or outlet-pipe and the nipple for producing an auxiliary connection with the nipple of the union.

In testimony, that I claim the foregoing as my invention, I have signed my name in presence of two subscribing witnesses.

ADAM EHEBALD.

Witnesses:
PAUL GOEPEL,
HENRY J. SUHRBIER.